US009946251B2

(12) United States Patent
Valasek

(10) Patent No.: US 9,946,251 B2
(45) Date of Patent: Apr. 17, 2018

(54) METHOD FOR MINIMIZING THE APPEARANCE OF UNDESIRABLE TOOL MARKS DURING CNC OPERATIONS

(71) Applicant: Raymond Joseph Valasek, Eugene, OR (US)

(72) Inventor: Raymond Joseph Valasek, Eugene, OR (US)

( * ) Notice: Subject to any disclaimer, the term of this patent is extended or adjusted under 35 U.S.C. 154(b) by 452 days.

(21) Appl. No.: 14/511,175

(22) Filed: Oct. 10, 2014

(65) Prior Publication Data
US 2015/0104615 A1 Apr. 16, 2015

Related U.S. Application Data

(60) Provisional application No. 61/889,226, filed on Oct. 10, 2013.

(51) Int. Cl.
*G05B 19/18* (2006.01)
*G05B 19/4093* (2006.01)

(52) U.S. Cl.
CPC .......... *G05B 19/40937* (2013.01); *G05B 2219/36515* (2013.01); *G05B 2219/45212* (2013.01); *Y02P 90/265* (2015.11); *Y10T 428/24612* (2015.01)

(58) Field of Classification Search
CPC ................................. G05B 19/40937
USPC .................................. 700/186, 160
See application file for complete search history.

(56) References Cited

U.S. PATENT DOCUMENTS

2007/0019271 A1* 1/2007 Schrunk .............. B44C 5/04
359/227

* cited by examiner

*Primary Examiner* — Brent T O'Hern
(74) *Attorney, Agent, or Firm* — Eric Harvey

(57) ABSTRACT

A method for preparing tool paths for use in a computer numerically controlled machine whereby the appearance of undesirable horizontal tool marks are minimized, comprised of identifying a surface texture and resolving the surface texture into at least one contour and identifying an underlying relief. A tool path is then prepared which is suitable for use in a computer numerically controlled machine wherein the tool path moves in accordance with the at least one contour of the identified surface texture while simultaneously carving the underlying relief.

12 Claims, 10 Drawing Sheets

METHOD FOR MINIMIZING THE APPEARANCE OF UNDESIRABLE TOOL MARKS DURING CNC OPERATIONS

CROSS-REFERENCE TO RELATED APPLICATIONS

This application claims the benefit of U.S. Provisional Application No. 61/889,226 filed Oct. 10, 2013 titled "System for production of cnc carved panels."

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the field of tool path creation for computer controlled cutting operations. Particularly the invention relates to creating tool paths which minimize the appearance of undesirable tool marks and articles of manufacture created using the novel tool paths.

2. Summary of the Prior Art

Conventional CNC (computer numeric control) manufacturing refers to the use of a type of computerized industrial tool in which the motion of a cutting tool is dictated by computerized commands. The type of CNC used for carving is generally known as a CNC router and consists of a table with a moving gantry on which a moving router or spindle is mounted. The spindle or router carves a target surface with differently sized and shaped router bits.

One use for CNC routers is producing a textured panel for use on a wall inside a building. Several companies now produce carved, textured panels for ornamental purposes with CNC machinery. These textured panels are used to cover entire walls or parts of walls, the fronts of reception desks, as cabinet and entry doors and for other decorative purposes. The material used for them is often MDF (medium density fiberboard) but it can also be natural wood, plastics or other materials.

Textured panels are mostly produced by passing a large round-end (also known as a ball-nose) router bit over the surface in specific paths to carve the textures as quickly as possible. In some cases straight or v-shaped bits are used. Currently available textured panel designs almost entirely consist of abstract texture but also include some line patterns which are representational of flowers or scrollwork. These representational patterns are created in the manner of line drawings with the router bits carving simple lines into the surface at a uniform height.

Another category of relief carving exists besides the carving of textures, bas relief. Bas relief sculpture is found on classical carved furniture, older building facades or the surfaces of coins where faces of American Presidents and other notables or buildings or birds and animals are sculpturally represented. This type of carving is differentiated from that used to create contemporary textured panels whose designs consist of a myriad of completely abstract textures or textures suggesting patterns like the surface of flowing water or a brick wall. Textured panels as they exist today do not normally represent actual objects such as leaves or fruit or the forms of classical ornament but if they do, these textures take the form of simple line drawings milled at constant depth. The primary reason is that the CNC production of representations of actual objects with conventional techniques results in undesirable tool marks and requires a very large amount of machine time in order to prevent the need for secondary processing.

CNC machinery is fully capable of producing traditional complex bas-relief carving with fine detail, however the process requires that smaller router bits are passed many times (often over 100 passes per linear inch) over each section of the carving to achieve acceptable results. Carvings such as these are offered today by many makers of carved ornament such as Enkeboll Designs. It would be considered desirable to offer more defined carved motifs, yet because of the high levels of production time required complex sculpted reliefs such as these or any other type of representative reliefs are not offered by the makers of textured panels.

Additionally in carving of representative reliefs where small bits are used and the machine may make 100 passes per inch the router bit leaves slightly visible marks in the form of grooves and peaks on the underlying relief. These grooves and peaks are known as tool marks. The grooves and peaks in conventional CNC operation are perfectly parallel to each other. If small enough the marks are accepted and generally meet industry and consumer standards but they are often sanded away since they impart a machine-made look to the carvings. The tool marks are considered undesirable and would generally be avoided if a technique were available to carve finely detailed or representative work without them.

Additionally, in general, a larger diameter bit can cut a relief with less passes, however a larger diameter tool will leave larger tool marks if each pass is stepped over a large distance, as results when cutting with less passes. Thus, even though a larger tool can perform a cutting operation quicker, because of the undesirable effects of larger tool marks which result with currently used tool path creation methods, CNC carving remains a slow process.

One way to decrease required carving time it to increase the material removed with each pass of a cutter being operated along a given contour of a tool path. A basic concept of carving into materials with CNC machinery is to never put so much load on your cutting tool that it breaks. Conventionally the rule has been to never carve down deeper than the diameter of the bit on one pass. So when carving at a maximum depth of 1" with a ¼" diameter cutting tool a tool path is constructed which directs the cutting tool to cut away ¼" of material from all deeper areas, then another pass of ¼" and then another. Only then may the final pattern of tool paths be run which will carve the final surface without ever making a cut deeper than ¼". This process may involve several different sized and shaped bits and takes a large amount of machine time but it is the conventional approach to CNC carving. The staggered depth of cut described above increases the time required to carve a given relief.

There is a need in the art for a method of tool path creation for CNC machines which enables an operator to remove material from a target surface quicker and with reduced appearance of tool marks oriented so that they create a regular machine made appearance.

SUMMARY OF THE INVENTION

The present invention is generally directed to methods suitable for producing a tool path for computer controlled cutting operations that reduces the appearance of undesirable tool marks on a finished work piece.

One aspect of the invention is a method for preparing tool paths for use in a computer numerically controlled machine. This method is comprised of identifying a surface texture and resolving the surface texture into at least one contour, identifying an underlying relief, and preparing a tool path suitable for use in a computer numerically controlled machine wherein the tool path moves in accordance with the at least one contour of the identified surface texture while simultaneously carving the underlying relief.

Another aspect of the invention is a method of preparing tool paths that display minimal tool marks for use in a computer controlled machine that uses the manipulation of a surface rather than a tool path to reduce the appearance of undesirable tool marks. This method is comprised of identifying an underlying relief for carving and modifying the underlying relief by merging the surface of the underlying relief with a texture pattern to produce a resultant surface such that the resultant surface has the general topography of the underlying relief and a surface texture that matches the texture of the texture pattern. The resultant surface is then used for producing a tool path in machine readable instructions for carving.

BRIEF DESCRIPTION OF THE DRAWINGS

FIG. 18 depicts a panel system constructed according to aspects of the invention.

DETAILED DESCRIPTION OF THE INVENTION

In general, one aspect of the invention relates to methods for designing computer numerically controlled (CNC) tool paths for use in a CNC cutting machine. Additionally, other aspects of the invention are directed to a new type of decorative carved panel that requires the use of the tool paths created by using the new methods. The method for panel creation described herein has many advantages over techniques now being used including the ability to carve complex forms quickly and attractively, vastly increased efficiency of production, elimination of seams and simplified mounting among others.

For the purposes of this disclosure tool marks are understood to refer to the ridges of remaining material left between adjacent tool paths when a CNC cutting tool removes material from a work piece. Additionally, the term tool path may refer to either a single contour of a large series of contours along which a cutting tool moves, or the plurality of contours which define an entire CNC cutting operation.

One aspect of the invention is a method of creating tool paths for use in CNC cutting machines that eliminates the problem of visible tool marks imparting a machine-made look. Conventional wisdom teaches using a small step over to simply minimize visible tool marks by making resultant tool marks smaller. Yet, embodiments of the current invention offer a method of producing tool paths to create attractive and desired textures by manipulating the tool marks left on a target surface by a cutting tool performing a carving operation. More particularly, embodiments of the invention are methods described herein for manipulating tool paths to produce tool marks on a surface that are in some embodiments minimized or hidden within an underlying relief and which in other embodiments are emphasized as a decorative element on the surface of an underlying relief.

Figure 1:
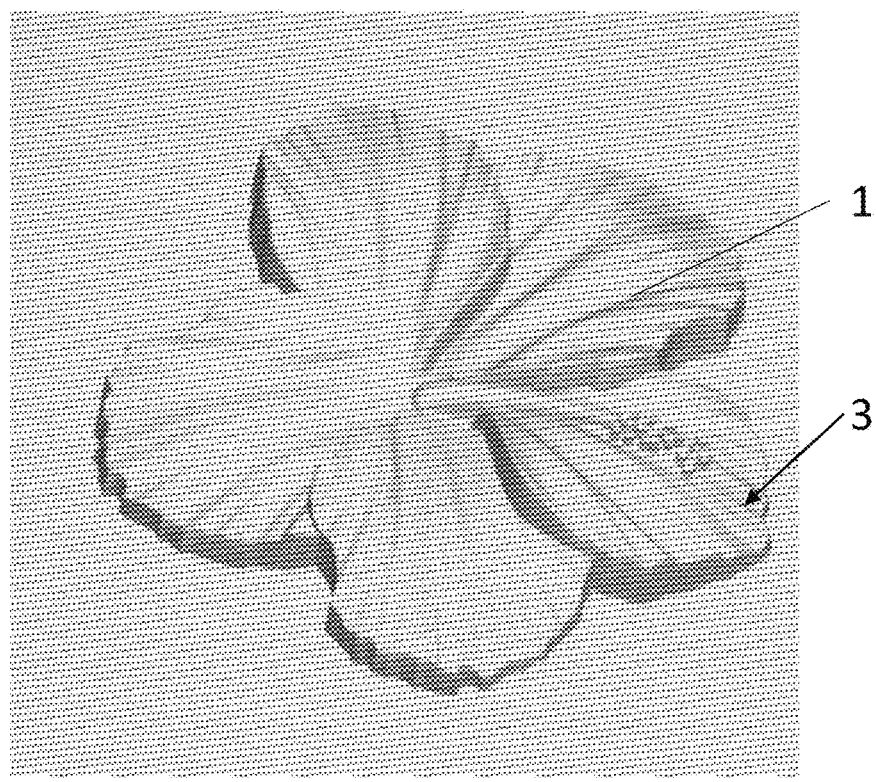
FIG. 1 depicts a target surface with parallel tool paths depicted over the surface.
Figure 2:
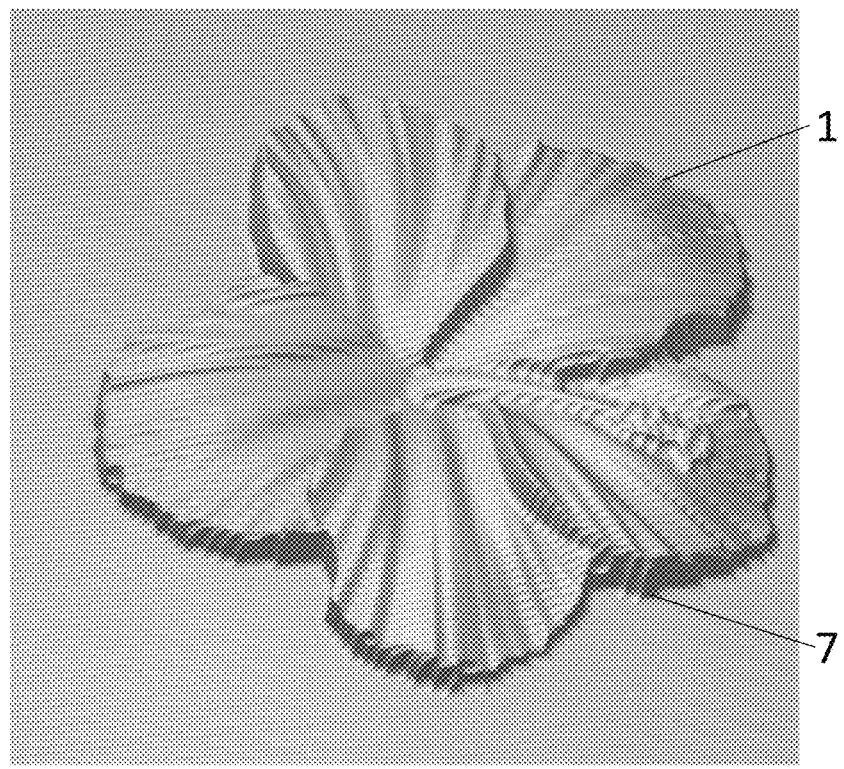
FIG. 2 depicts a target surface after being carved with the tool paths depicted in FIG. 1.

FIG. 1 depicts a target surface that includes a flower relief 1 on the surface and parallel tool paths 3 depicted over the flower relief 1. Carving the flower relief 1 with a CNC cutting tool following the parallel tool paths 3 and moving along the contours of the flower relief 1 in the Z direction will result in the flower relief 1 having a surface that shows visible and undesirable substantially parallel tool marks 7 as shown in FIG. 2. Consumers generally regard regular spaced parallel tool marks as evidence of a product being machine made.

Figure 3:
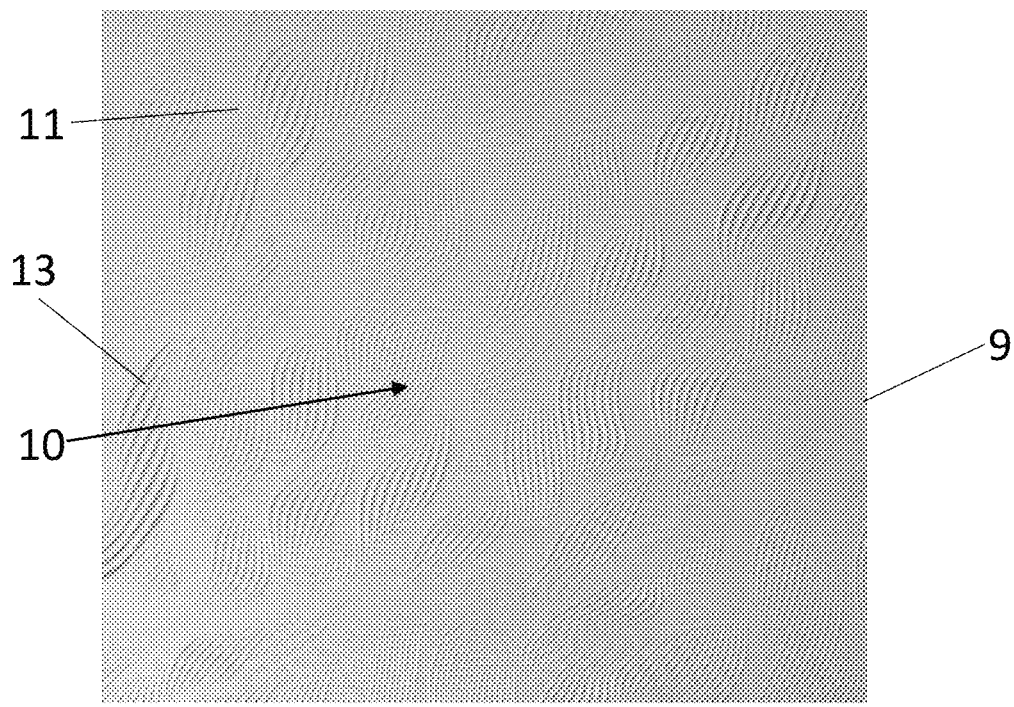
FIG. 3 depicts a surface texture which will result from carving a flat surface with tool paths as taught by aspects of the invention.

FIG. 3 depicts a surface texture which results from facing a flat surface 9 with CNC a cutting tool which follows tool paths as taught by aspects of the invention. In the particular embodiment shown in FIG. 3, the tool paths followed curving lines which are not parallel to each other but which constantly vary in distance from each other within designated parameters. Using tool paths which follow curving lines which are not parallel to each other results in the tool marks 11 shown in FIG. 3. The resulting tool marks 11 create a surface texture 10. Notably, the resulting tool marks 11 create a natural looking attractive surface texture 10 which is aesthetically pleasing and is not associated with consumers as being machine made because the plurality of tool marks 11 are not substantially parallel.

Additionally, the use of tool paths which follow curving non-parallel lines can increase the efficiency in terms of time for cutting a target relief. This occurs because a target relief may be carved with as few as 15 passes per inch instead of the conventional 100. Such a small number of passes is acceptable because although the tool marks 11 become larger in the regions with fewer passes per inch 13, as a whole the tool marks left on the surface are substantially non-parallel. To consumers, substantially non-parallel tool marks do not result in a negative connotation that many consumers have with an article of manufacture being "machine made."

Figure 4:
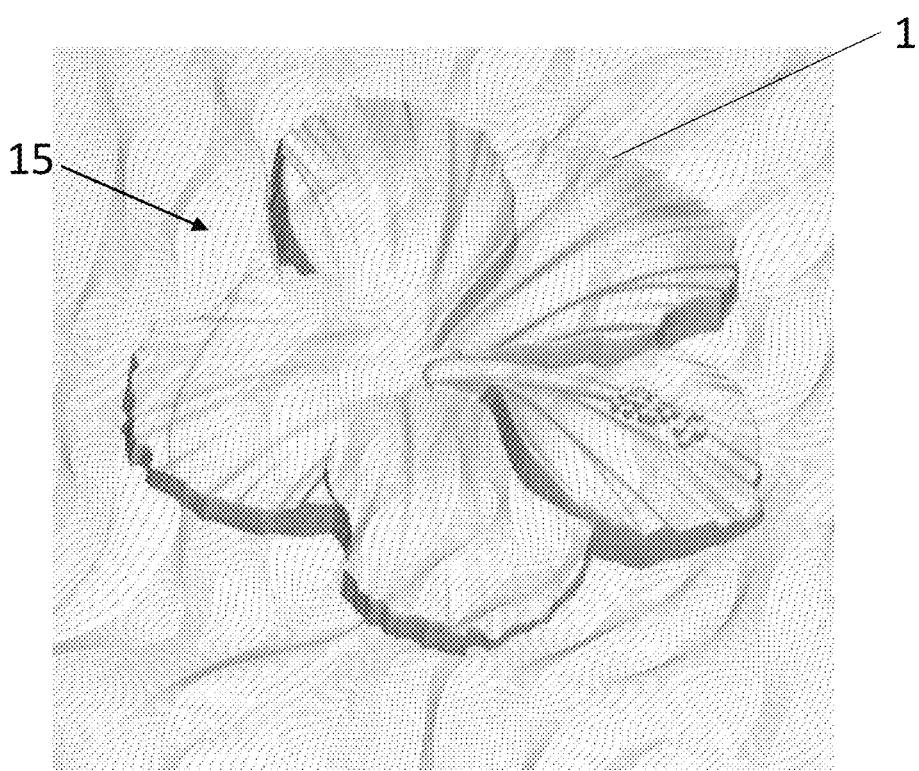
FIG. 4 depicts a target surface with the tool path used in FIG. 3 depicted over the target surface.
Figure 5:
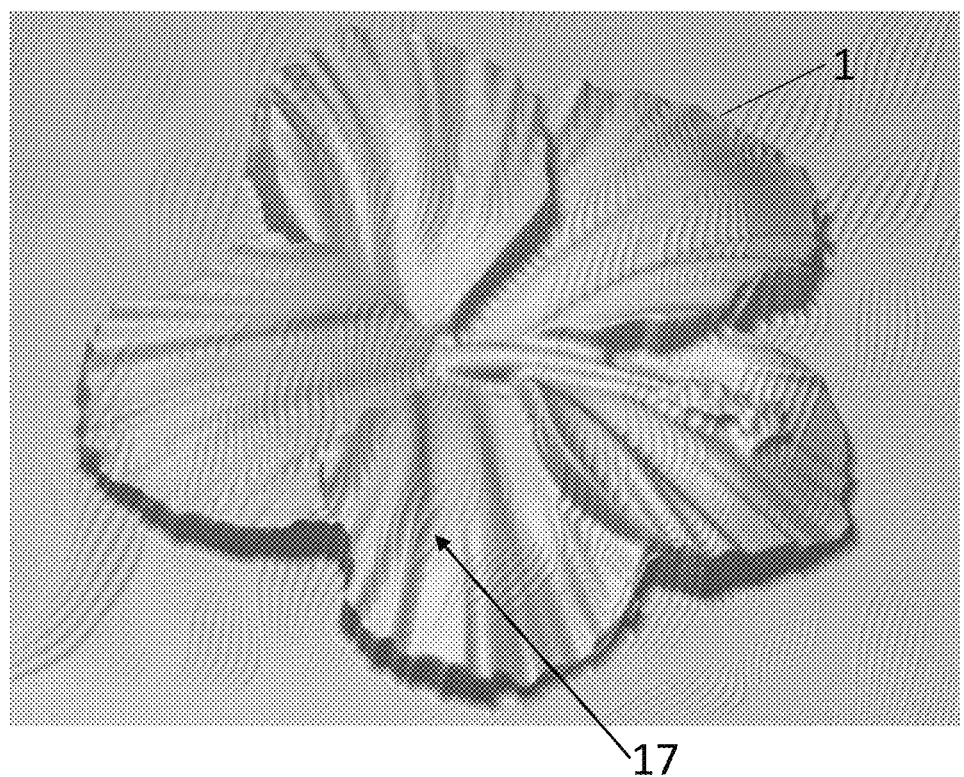
FIG. 5 depicts the target surface shown in FIG. 4 as carved in accordance with the tool paths depicted in FIG. 4.

FIG. 4 depicts a flower relief 1 on a target surface with a plurality of non-parallel tool paths 15 overlaid on the target surface. The non-parallel tool paths 15 are the same tool paths as used to face the flat surface shown 9 in FIG. 3. The result of carving the flower relief 1 on the target surface as depicted in FIG. 4 with the non-parallel tool paths 15 is depicted in FIG. 5. Notably, the resulting tool marks 17 have a substantially non-uniform appearance. The non-uniform appearance of the tool marks 17 add to the aesthetic appeal of the carved surface. Even though the flower relief 1 in FIG. 5 was carved by a machine, the regularly spaced parallel lines over the entire surface which indicate that a relief was carved by a machine are not present. Additionally, the tool marks 17 produce a surface texture which increases the aesthetic value of the flower relief 1.

Referring back to FIG. 3 and FIG. 5 the surface texture 10 identified in FIG. 3 and which resulted from the tool marks of a cutting tool cutting the flower relief 1 as shown in FIG. 5 is simply one embodiment of a surface texture which can be carved simultaneously with an underlying relief. Particularly, the surface texture with non-parallel contours is desirable when trying to minimize the tool marks which a consumer may identify negatively with being "machine made." However, in alternative embodiments, an operator may use the method describe herein to create tool marks which are desirably visible.

Non-parallel curving lines are not the only method for carving a decorative or artistic surface texture over an underlying relief. As envisioned by the invention any pattern of tool path lines may be used. Any line pattern which covers enough of the surface of a relief to be carved so that when a cutting tool is directed to carve along its length it reveals the shapes and forms of underlying reliefs can be made to accomplish this. It is possible to use the lines of a constantly repeating logo for a carving intended for an office or retail setting. Straight lines at angles may be used or even a cursive track of the words to The Declaration of Independence. Any of thousands of patterns may be employed. The common element for all these being the use of a line pattern to create a decorative or intended surface texture while underlying reliefs are being shaped.

Figures 6, 7:
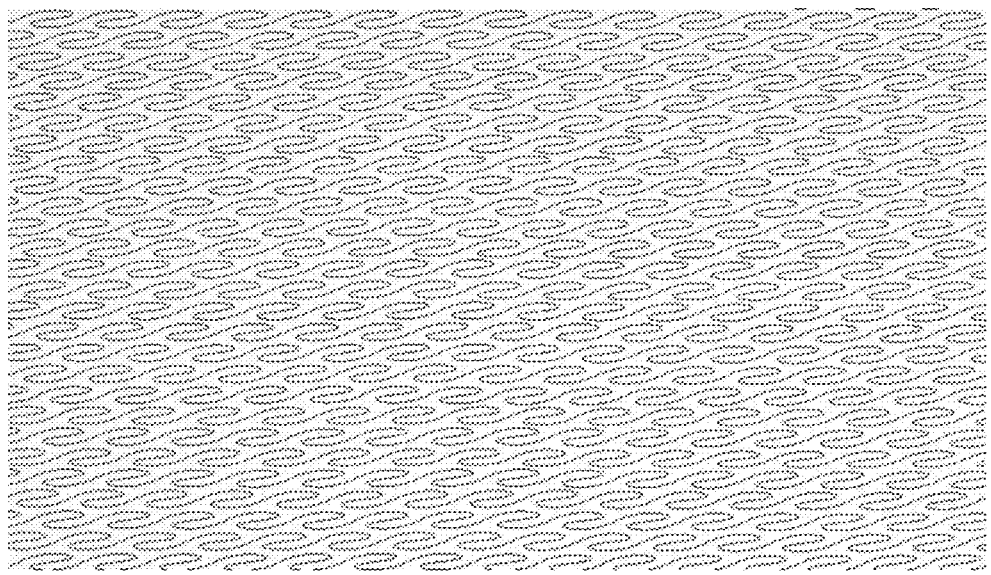
FIG. 6 depicts a tool path pattern element.
FIG. 7 depicts a tool path consisting of a large array of tool path pattern elements.

Referring to the use of a constantly repeating line design for a tool path FIG. 6 depicts a single representative line design element 19. The line design element 19 may be any sort of line design such as a logo depicted from a contiguous line element, or a long string of cursive writing. FIG. 7 depicts a large array of design elements 19 configured so that the large array of design elements 19 form a single line which is used to form the basis of a tool path for a CNC cutting tool.

Figure 8:
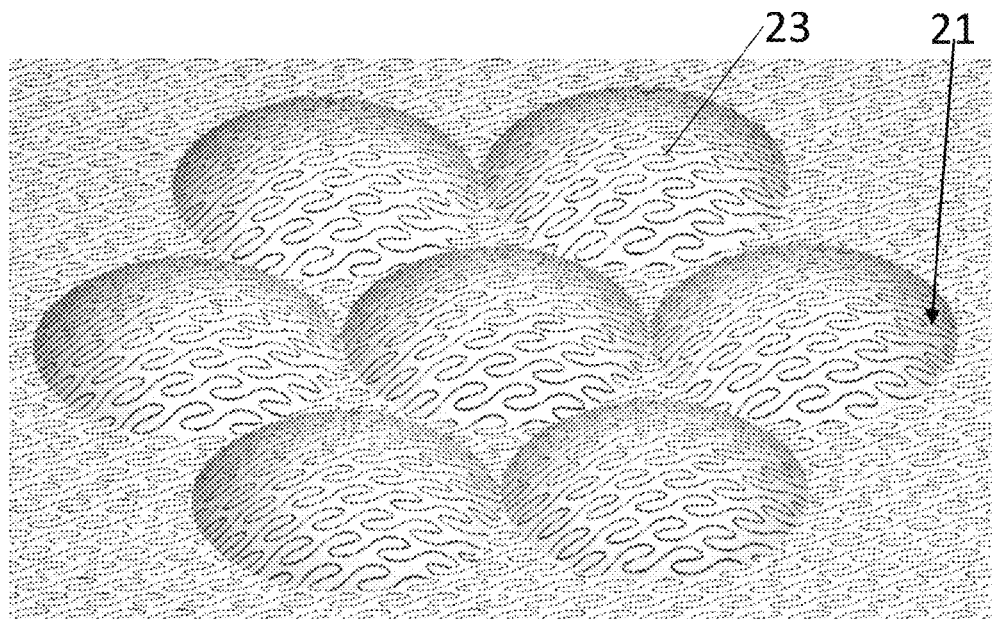
FIG. 8 depicts a target surface with the tool path shown in FIG. 7 depicted over the target surface
Figure 9:
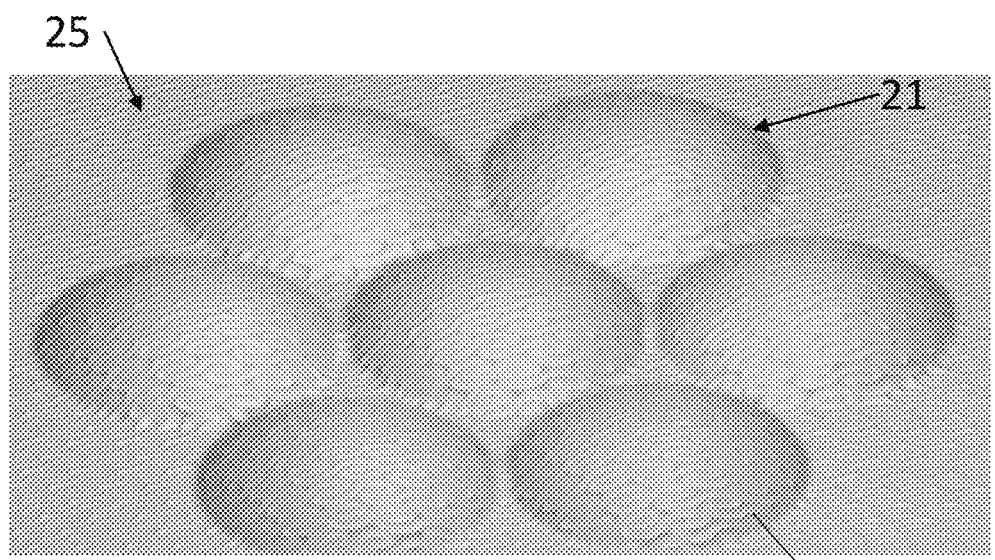
FIG. 9 depicts the target surface shown in FIG. 8 after being carved according to the tool path depicted in FIG. 8.

The large array of line design elements 19 is shown as a tool path overlaid on an underlying relief 21 in FIG. 8. When a CNC cutting tool is used to carve the underlying relief 21 identified in FIG. 8 with the tool path 23 created by arranging a large array of line design elements 19 the resulting surface has a repeating surface texture 25 as shown in FIG. 9. Notably, the method of selecting a desired surface texture, identifying an underlying relief and then preparing a tool path that moves a cutting tool in accordance with at least one contour of the identified surface texture while carving the underlying relief creates surface texture by way of tool marks 27. Embodiments of the invention use tool marks as a desirable feature, rather than a feature to be reduced by tool path design or eliminated via secondary processing as with conventional methods of CNC carving.

Figure 10:
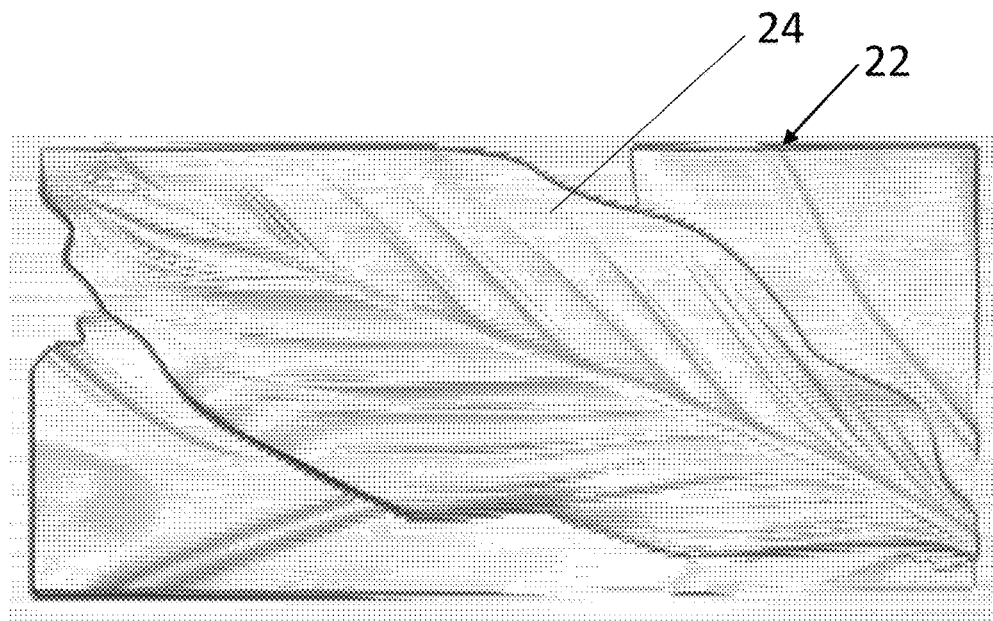
FIG. 10 depicts the target surface after being carved with a raster style tool path.
Figure 11:
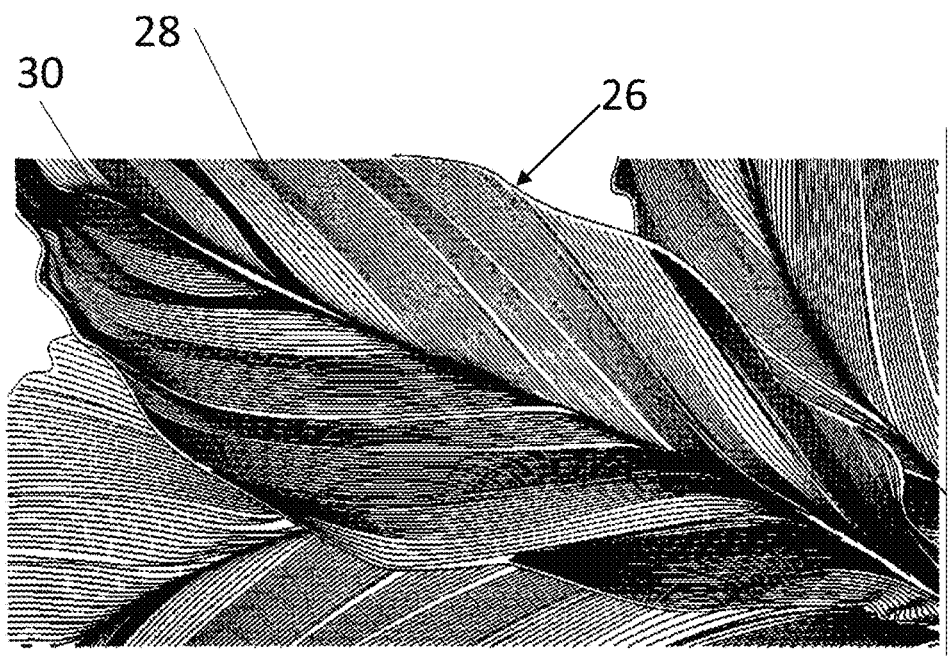
FIG. 11 depicts the target surface with a tool path shown as created according to aspects of the invention.

A particular example of how the new method offers unprecedented capabilities for CNC carving is shown in FIG. 10. FIG. 10 depicts a relief of a leaf 22 that has been carved using a standard raster path, which leaves horizontal tool marks 24 on the surface of the resulting relief. FIG. 11 depicts a series of tool paths created according to the methods described herein. Notably in different areas, the tool paths are substantially nonparallel 28, 30 to tool paths in other areas. Additionally the distances between adjacent tool paths in some areas are substantially more than the standard of 0.01" in the region of tool paths indicated by reference numeral 28. Whereas, in the region indicated by 30 the distance between adjacent tool paths much less, or even 0" of step over.

When carving with this method it's necessary to find a balance of tool size relative to the underlying relief and the desired surface texture. For instance, in carving a relief of a leaf in which the size of the leaf ranges between 2" and 4" a ballnose cutting tool size of 1" would be unable to carve detail fine enough to distinguish the leaves no matter how fine the step over since it simply cannot fit into the small areas between the lobes of the leaves. An optimum tool would therefore be a maximum size of ¼" which would use a tool path with a maximum distance between passes of 3/16" between adjacent tool paths and a minimum distance between adjacent tool paths of 0". In other embodiments of the method taught herein, the cutting tool may be a 3/16" or ⅛" ballnose bit which are used with a maximum distance between adjacent tool paths of 5/32" and 3/32" respectively.

Figure 12:
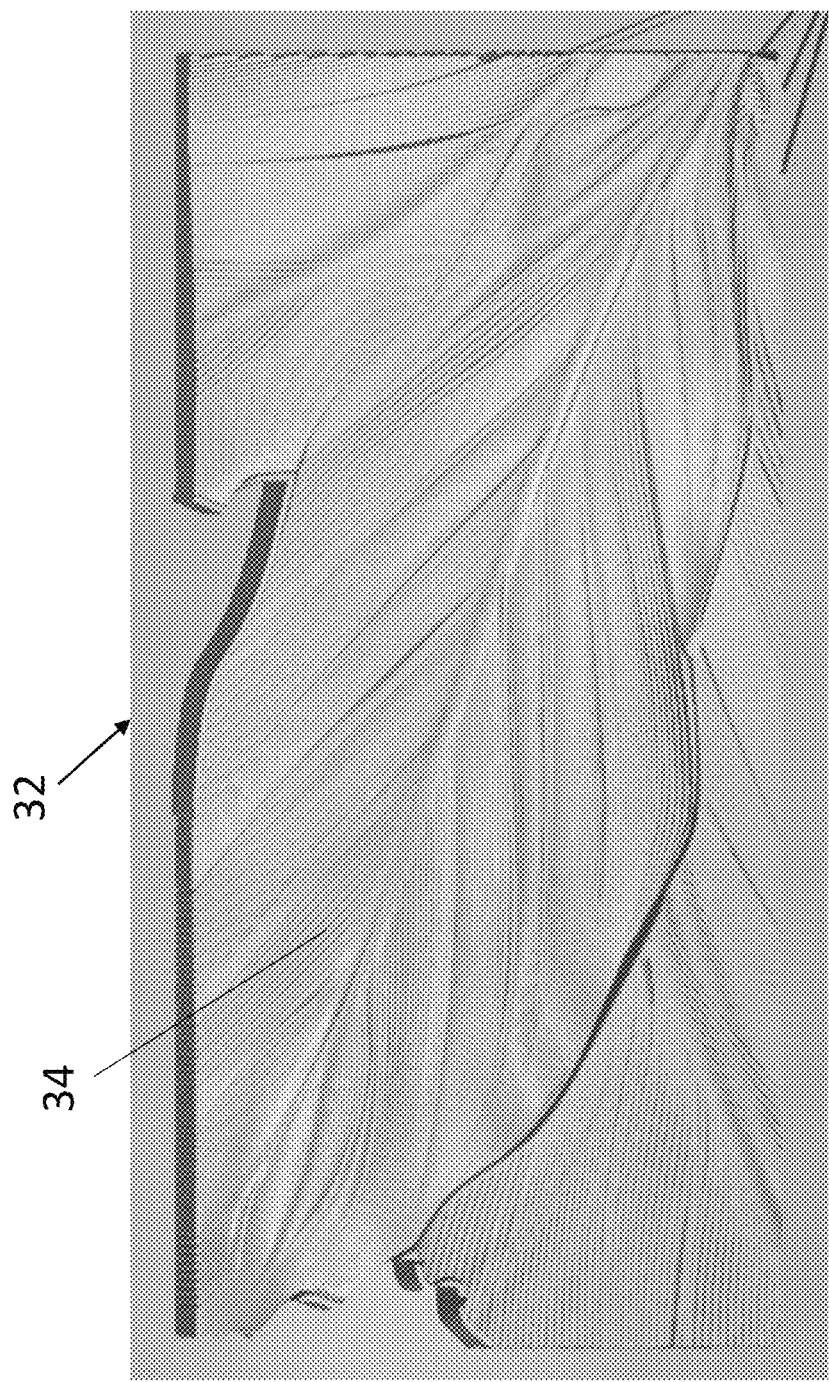
FIG. 12 depicts relief shown in FIG. 10 carved with the tool paths depicted in FIG. 11.

The tool paths depicted in FIG. 11 when performed by a CNC cutting tool result in a relief such as the one depicted in FIG. 12. Notably, the tool marks indicated by 34 which resulted from the section of the tool path indicated by 28 in FIG. 11 are visible but add to the overall aesthetic effect of the relief. Comparing the resultant relief in FIG. 12 to the resultant relief in FIG. 10, the relief in FIG. 12 can be carved with a decreased appearance of horizontal tool marks that indicate a machine produced relief. As a result, the secondary processes such as sanding which are necessary for a panel carved with a conventional raster pattern are not necessary.

In some cases the underlying reliefs are carved with the second layer of texture adding to the detail of the underlying relief. If a leaf form is used as the underlying relief then the second level of texture may be added in shapes which suggest the natural veining of the leaf as in FIG. 12.

It is important at this point to highlight that the previously described aspects of the new method relates to the use of particular line designs as the basis for a tool path which will carve an underlying relief while also intentionally texturing the relief with the tool marks which will be produced by a cutting tool operated according to the tool path. This approach creates a second level of carved enhancement while eliminating the standard machine raster or other geometrical patterns produced by conventional CNC tool paths. Conventional CNC tool paths are programmed to reproduce the underlying relief while minimizing the appearance of tool marks via a very small step over distance, or the use of small router bits.

Aspects of the current invention also relate to techniques for manipulating the surface of an underlying relief to minimize the appearance of tool marks. This aspect of the invention merges the surface of a target relief with a very fine surface texture. As a CNC cutting tool performs a raster style cutting path on the underlying relief, the surface texture causes the cutting tool to rise and fall slightly as it carves the surface of the underlying relief and creates a random appearing, non-artificial looking texture over the underlying relief. In effect this confuses and disguises the tool marks which would be raster lines so that, to a large extent they disappear because they blend in with the surface finish of the underlying relief.

For the purposes of this disclosure, surface texture refers to a surface texture that has a random looking appearance. Although particular elements within a surface texture, or the texture itself may repeat in a given linear direction. The individual elements of the surface texture may be any shape, but preferably they are scallop shaped.

Figure 13:
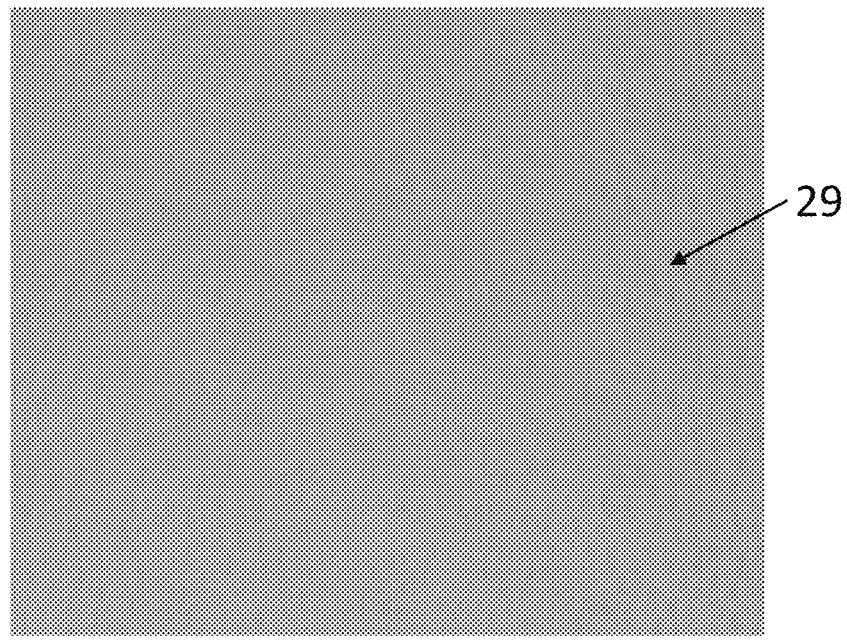
FIG. 13 depicts a texture pattern.

FIG. 13 depicts a surface texture 29. The randomized texture 29 depicted in FIG. 13 is comprised of a large number of scallops with a depth of approximately 0.015" and a substantially similar width and height. The exact dimensions of the surface texture may vary from application to application without deviating from the invention disclosed herein. In general, if the surface texture is to large relative to an underlying relief, it will tend to distort the underlying relief to an extend that is undesirable. Also, if the underlying relief is too small relative to the target surface, the effect of the surface texture on the minimization of tool marks will be reduced.

The size and depth of the texture must be factored according to the cutting tool used for carving in order to confuse and disguise the parallel tool marks. In this method any size bit may be used, even very large ones such as a design carved by a 1" sized ballnose cutting tool where the texture added would be scallops of 0.32" in width, 0.56" in height and a depth of 0.06".

Figure 14:
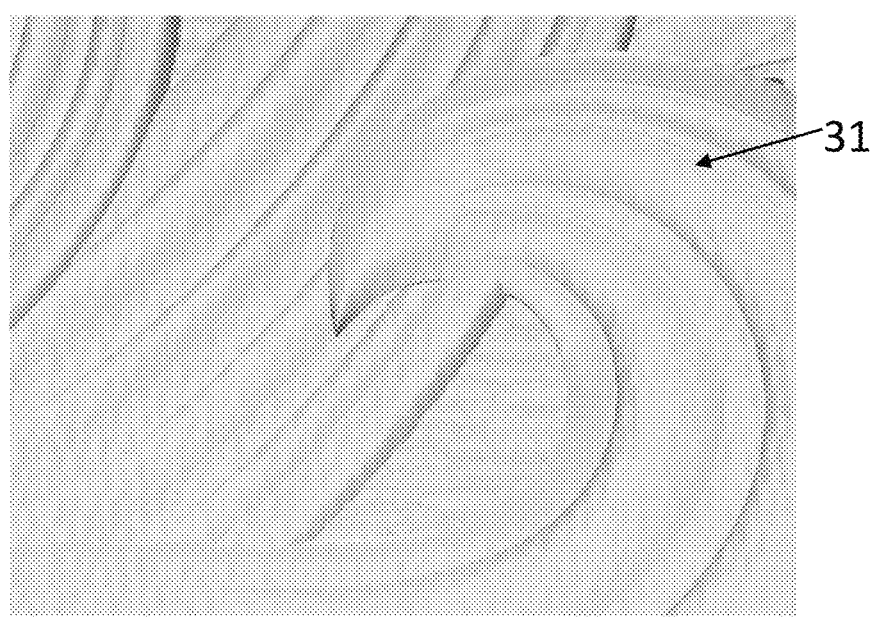
FIG. 14 depicts an underlying relief.
Figure 15:
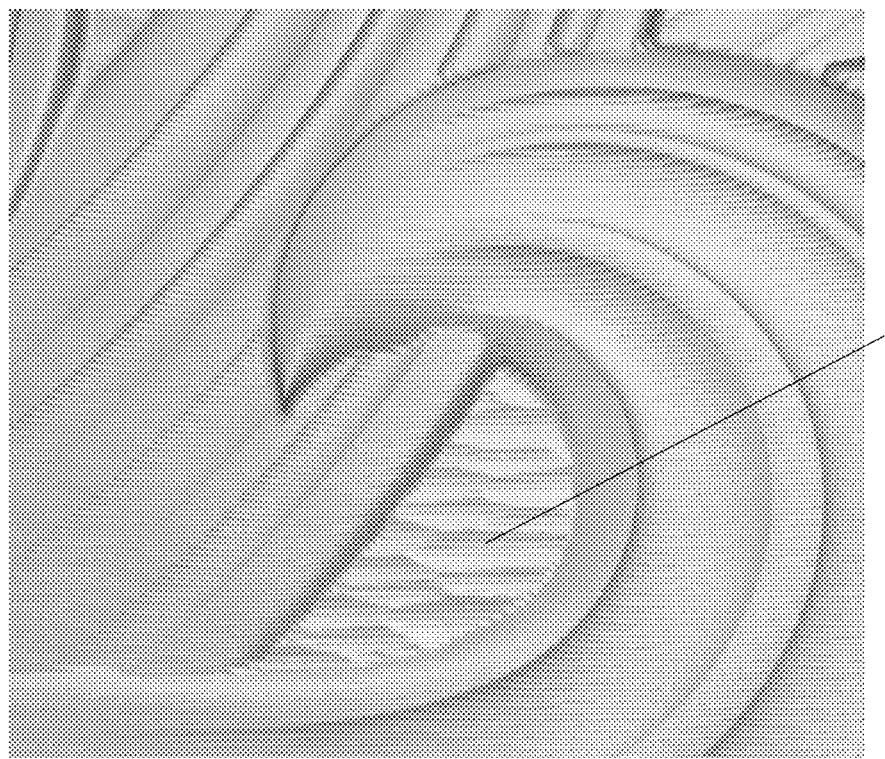
FIG. 15 depicts the surface of the underlying relief merged with the texture pattern.

FIG. 14 depicts an underlying relief which is a relief of a wave 31. FIG. 15 depicts the relief of a wave 31 after being carved by a CNC cutting tool with a standard raster pattern. The horizontal tool marks 33 create an undesirable surface finish that detracts from the overall aesthetic impression of the underlying relief. Additionally, consumers will associated the regularly spaced parallel tool marks as being machine made.

Figure 16:
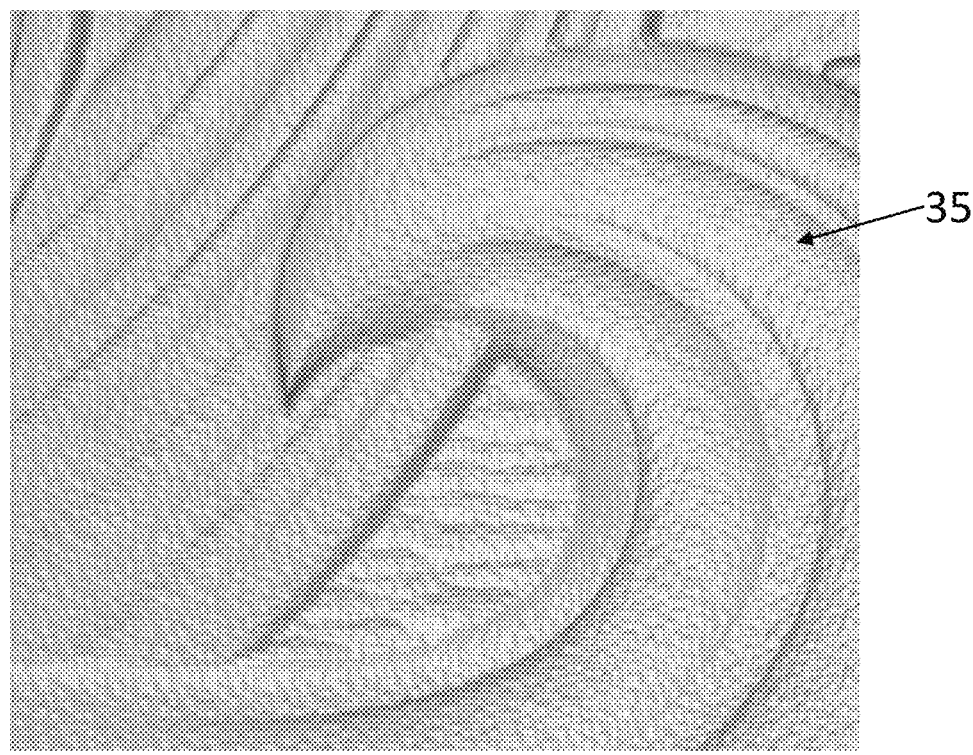
FIG. 16 depicts the underlying relief of FIG. 11 carved using a raster technique.
Figure 17:
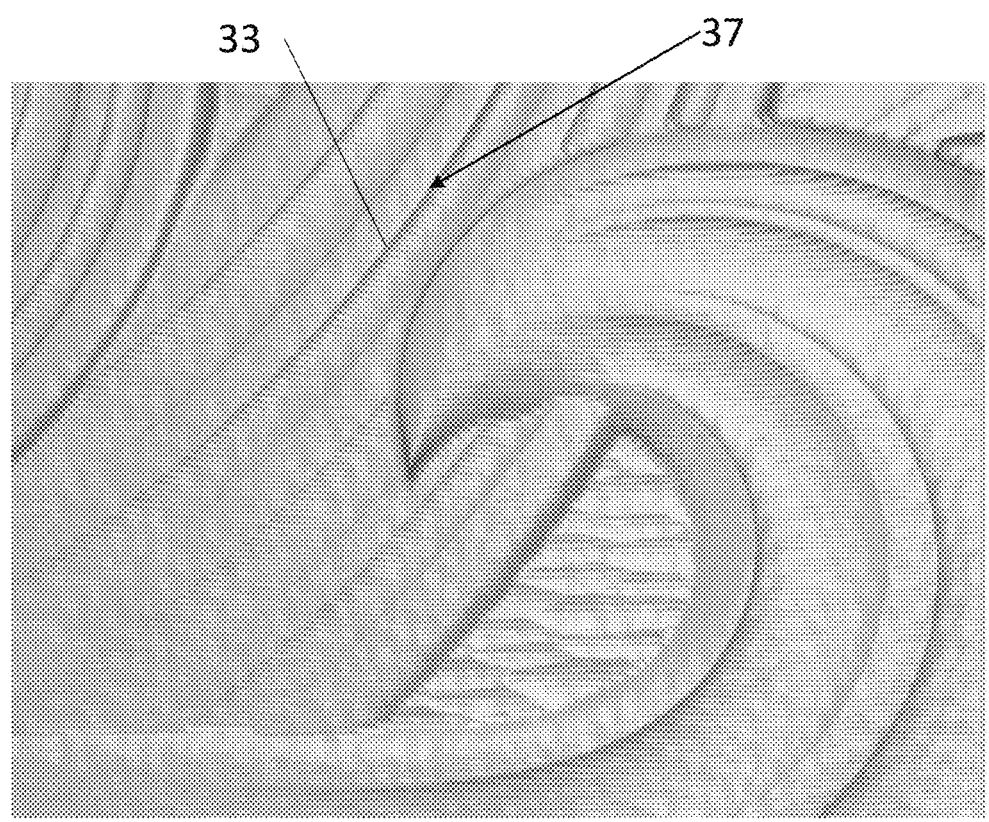
FIG. 17 depicts the resultant surface of FIG. 12 carved using a raster technique.

FIG. 16 depicts the resulting relief 35 after merging the surface of the relief of a wave 31 shown in FIG. 14 with the surface texture 29 depicted in FIG. 13. FIG. 17 depicts the result of performing a standard raster type CNC tool path cutting operation on the resulting relief 35. In general, the appearance of horizontal tool marks 33 has been greatly reduced. In areas with a sharp change in relief, the horizontal tool marks are still slightly visible. However, in sum, the visual effect of the horizontal tool marks 33 is greatly reduced compared to the resulting surface of the unmerged relief of a wave 31 shown in FIG. 15 after being carved.

The aforementioned methods allow a relief to be carved more quickly than standard procedures since the distance between passes of the router bit can be greater than normal. Aspects of the invention accomplish this through manipulation of the CNC tool path or the modification of the surface of the underlying relief.

It is also possible to create conventional straight raster lines and carve a relief with highly visible tool marks and for this to be a desired effect. This standard technique falls outside the invention which is directed toward the creation of a tool path which is devised to eliminate the look of parallel lines with regular spacing and replace it with another type of surface texture which is a desired enhancement.

In certain embodiments, the aforementioned methods can be used with an additional technique for increasing the depth of cut possible with a given cutting tool. A CNC tool path can be configured to cut material with a ¼" tool at a depth of 1" in the Z direction or more if the tool is only taking a small amount of material from the uncut surface with each pass. In order for this to be possible there are several approaches. One approach is for the cutting tool to be directed to cut down a slope so that it reaches the full depth of cut gradually while cutting only small slices of the material. Another approach is for the cutting tool to begin its passes entirely outside the block of material and gradually enter the material from one side at full depth. Yet another approach is that a slot may be cut into the material with successively deeper passes to allow the tool to reach the full depth where the cutting tool can begin cutting at full depth. Additionally, other methods of reaching full depth are possible such as constructing a spiral tool path which carves outward and then cutting slowly downward in one spot to reach full depth to begin the slicing cuts.

The methods described above, manipulating the tool path and manipulating the relief surface are both suitable for use with full depth cutting. When configuring a tool path to remove material at the final depth of cut in a single pass it is necessary to construct the contour lines of the tool path so that the tool is never directed into completely uncut areas but is always moving along the previously cut edge taking only minimal slices. Using the approaches for bringing the cutting tool to final depth, tool paths can, once at final depth be constructed to always and exclusively be moving along a previously cut edge.

Another aspect of the invention is an article of manufacture that is produced using the new methods for reducing the appearance of tool marks on textured panels. Currently textured panels are ordered in full 4' by 8' sheets or larger. These panels have many disadvantages in production, shipping and mounting. The splined textured panel system 40 depicted in FIG. 18 overcomes the prior art problems.

When textured panels are used to cover any surface with a length or width wider than the standard sheet of material, (usually 4×8 feet) it is considered desirable to hide the seams where the panels join to achieve the pleasing effect of an entire wall or panel with uninterrupted texturing. The splined textured strip system 40 uses much smaller panels 44 than the standard 4'×8' sheets. A groove similar to a saw kerf is cut into the edge of each panel 44 or a rabbet is cut on the back edge and a spline 46 is fitted to separate the panels 44. This separation can be any size but generally ranges from ⅛" to 2" depending upon the effect desired. At times the splines 46 may be as large as the panel strips or possibly even larger. The splines may consist of any material but would commonly be aluminum, painted or natural wood, Formica, plywood or plastics.

The spline 46 separations in most cases are on the sides of the panels but can additionally be on the tops or bottoms of the panels strips if desired, or even in squares creating a checkerboard effect. Alternatively carved pieces can be made to replicate the look of splined panels and applied directly to a substrate which has a desired finish so that the substrate appears between or all around each panel to yield a similar look to splined panels. This is achieved by making the panels thinner than normal or carving the edges lower so that the background appears to be part of the composition. This would be an aspect of the splined textured panel system 40 more likely to be used when the desired effect is similar to stained glass panels where each piece of glass is completely surrounded by came and thereby framed. The splines 46 eliminate the problem of seams by making the seams part of the decorative effect. Instead of being a difficulty to surmount the seams 46 between panels 44 become an enhancement to the overall effect.

With the splined textured panel system 40, it is possible to cover any size of wall or other surface with a consistent decorative surface. Since the seams are made an attractive addition to the design, any number of panels 44 may be put together with splines 46. Also, splines 46 are not limited to parallel straight lines but can also be curving or of any shape or completely surround the carved panels like the lead came in stained glass panels.

With the method of CNC tool path manipulation previously described, it is possible to carve not only textured surfaces like existing carved panels but underlying bas-reliefs 42 such as waves or leaf patterns with a overlying texture 44 such that the design has a continuous cohesiveness. These patterns of bas-relief 42 are not threatened or broken by the addition of the separated splines but actually enhanced by them. These designs can then be finished with conventional painting techniques.

Because of their narrower width the panel 44 strips themselves are not limited to flat sections as are all other textured panels but the surface may be carved with a convex front to create a highly distinctive and attractive column effect. Not only convex but any cross sectional shape such as S curves or raised V section shapes are made possible by the narrower panel sections. Also convex curved sections can be designed to fit around columns or other curving surfaces. In these cases the kerfs in the sides of the panels may be cut at an angle to facilitate the curve. Or the sections may be carved with an overall flat surface and then cut into thinner sections in order to fit curving surfaces.

Another advantage of the splined textured panel system 40 is that the panels 44 may now be any width and length. This makes crating and shipping easier and less expensive. The large textured panels available now must be crated in containers larger than 4×8 feet which are expensive to build and to ship. The splined textured panel system 40 avoids this disadvantage.

The production of narrow panels 44 on CNC machinery is much more efficient as many panels can now be carved at once on a machine fitted with multiple router heads. Conventionally full sheets of material are carved on a cnc machine with a single router which in the case of detailed patterns takes a large amount of expensive cnc time. Carving narrower strips with multiple heads can easily make the process 5 times more efficient and allow the cost-effective production of more detailed motifs. Also tongue and grooved strips with hidden or visible tongues or strips with completely hidden splines may be carved in this efficient manner with the carved or sculpted surface either continuous across strips or with each strip having a carved surface independent of that on adjoining strips.

Another advantage is that panels may also be pre-painted, (often with special effects outside the abilities of most painters and installers) and delivered to the customer ready to attach to the wall or other surface without the need for filling or painting. Since special effect painting would be difficult or impossible for the end consumer or their contractors, this means new types of carved and painted surfaces are available which are painted by effects professionals in the factory and delivered ready to mount. Painting professionals are not required to travel to the installation site. This type of carved panel may be easily and invisibly mounted by nailing or fastening the edges at the grooves made to receive the spline in the same manner as hardwood flooring is mounted.

Thus, specific methods and articles of manufacture relating CNC tool path creation and textured panels have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A method for preparing tool paths for use in a computer numerically controlled machine comprised of identifying a surface texture and resolving said surface texture into at least one contour; and identifying an underlying relief; and preparing a tool path for use in a computer numerically controlled machine wherein said tool path moves in accordance with the at least one contour of the identified surface texture while simultaneously carving the underlying relief.

2. The method of claim 1 wherein operating a cutting tool in accordance with said tool path results in a tool mark that is said surface texture.

3. The method of claim 2 wherein said tool path is curved and at least two adjacent segments of the tool path are substantially non-parallel.

4. The method of claim 2 wherein the tool path follows a pattern that is repeated in substantially the same form over the underlying relief.

5. The method of claim 3 for use with a ¼" cutting tool wherein a maximum distance between adjacent tool paths is 3/16".

6. The method of claim 3 for use with a 3/16" cutting tool wherein a maximum distance between adjacent tool paths is 5/32".

7. The method of claim 3 for use with a ⅛" cutting tool wherein maximum distance between adjacent tool paths is 3/32".

8. The method of claim 2 further comprising configuring the tool path to instruct a cutting tool to perform a final depth cut in a single pass.

9. A method of preparing tool paths that display minimal tool marks for use in a computer controlled machine comprised of identifying an underlying relief for carving; and
modifying the underlying relief by merging the surface of the underlying relief with a texture pattern to produce a resultant surface such that said resultant surface has the general topography of the underlying relief and a surface texture that matches texture pattern; producing a tool path in machine readable instructions for carving the resultant surface.

10. The method of claim 9 wherein the surface texture is comprised of scallop shaped elements with a width of less than 0.32" a height of less than 0.56" and a depth of less than 0.06".

11. The method of claim 10 further comprising configuring the tool path to instruct a cutting tool to perform a final depth cut in a single pass.

12. A Method for carving decorative panels comprised of identifying an underlying relief, producing a raster type tool path for carving the underlying relief on a computer numerically controlled machine with a cutting tool wherein said raster type tool path has a stepover for at least two adjacent tool path segments which is not constant and wherein said at least two adjacent tool path segments are non-parallel.

* * * * *